Patented June 8, 1943

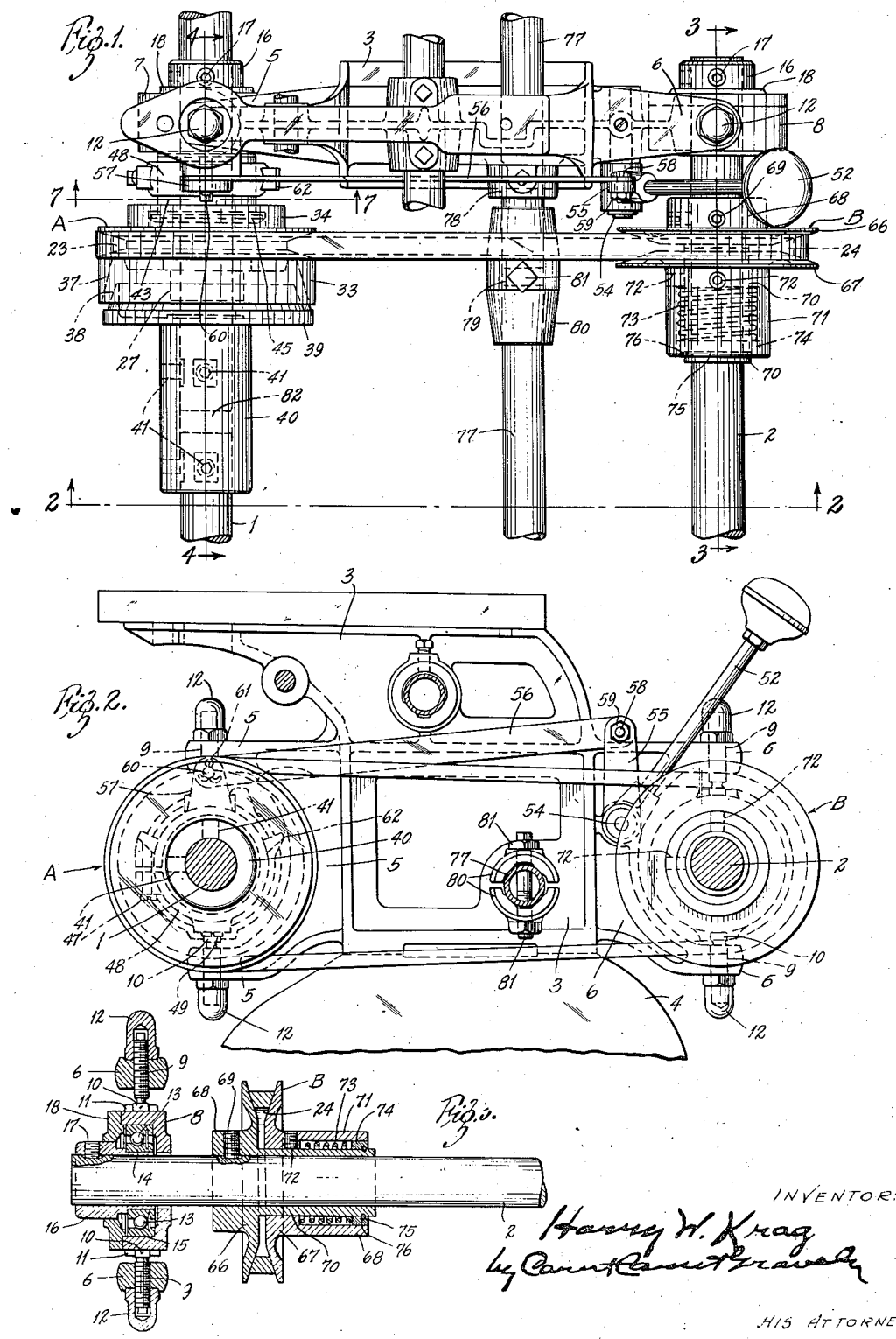

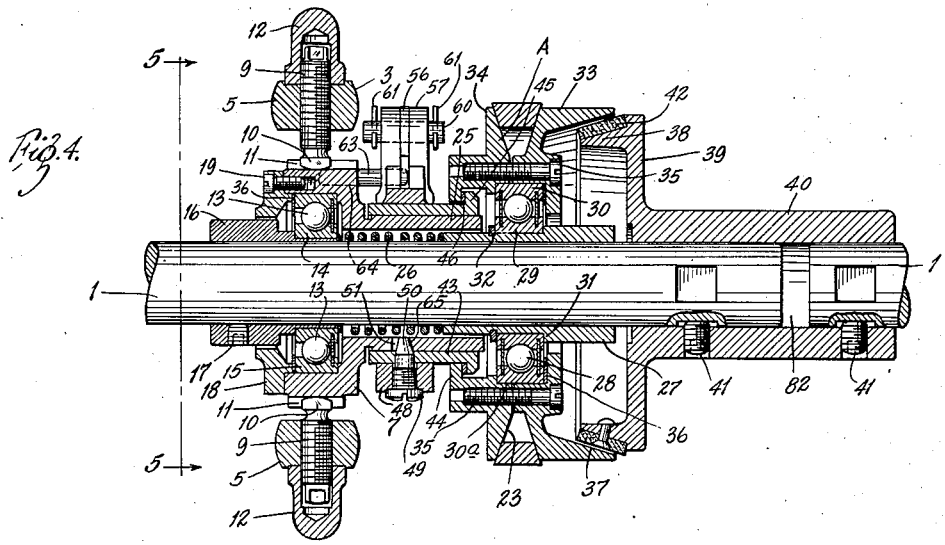
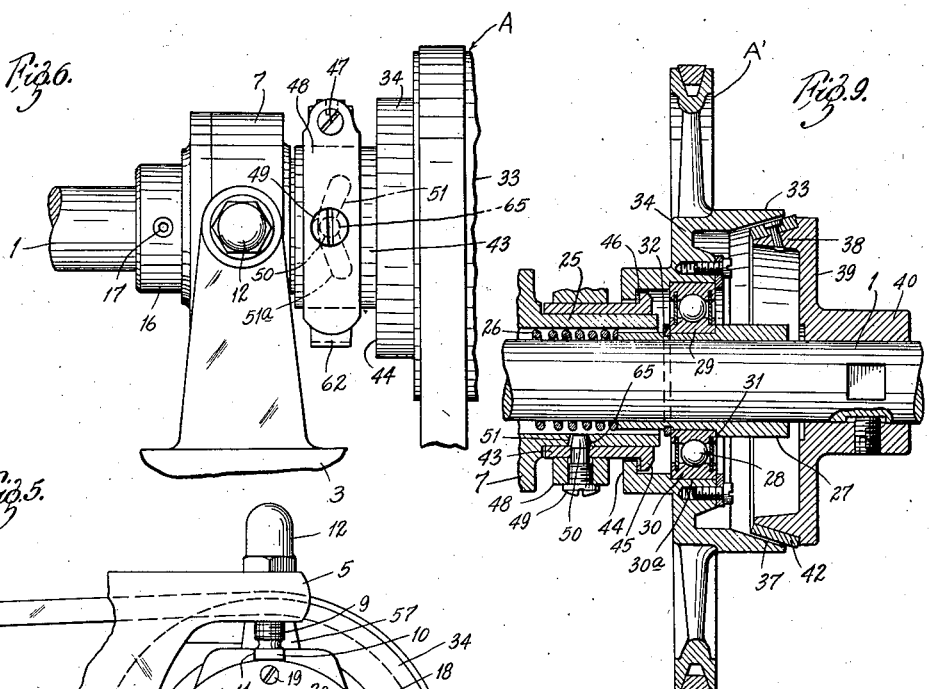
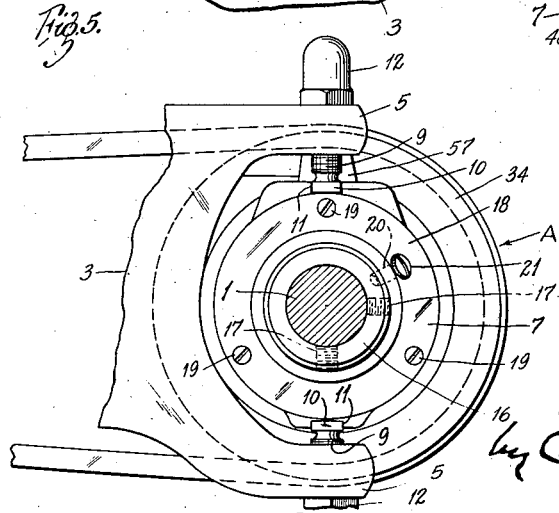

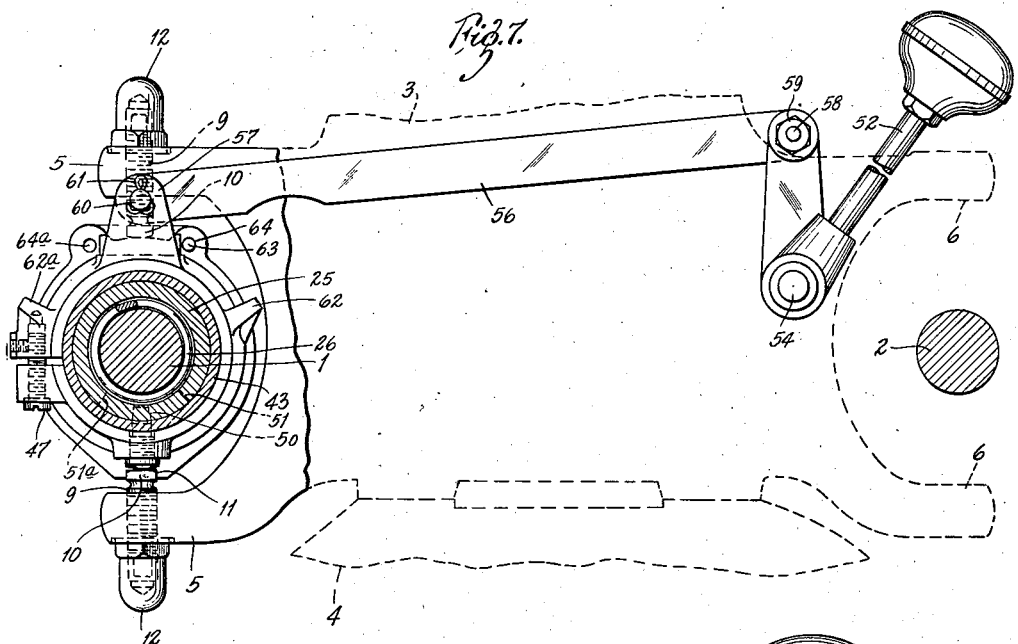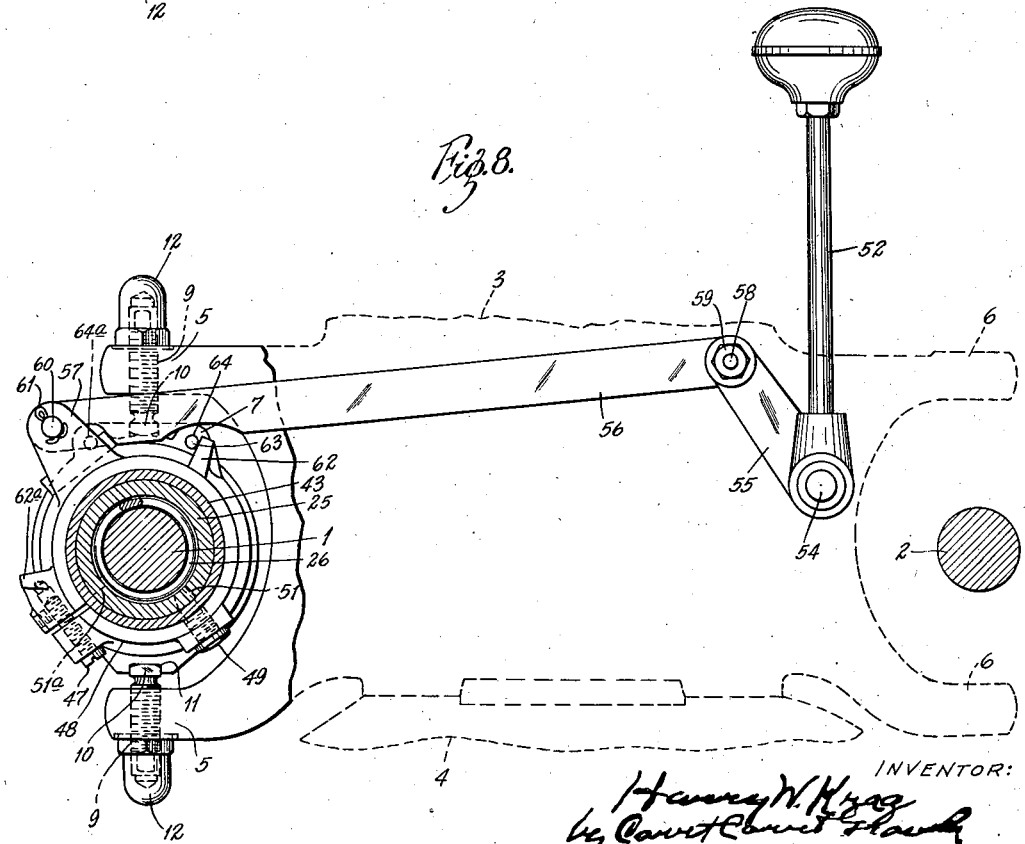

2,321,494

UNITED STATES PATENT OFFICE 2,321,494

DRIVE MECHANISM

Harry W. Krag, Vinita Park, Mo., assignor to American Shoe Machinery and Tool Company, St. Louis, Mo., a corporation of Missouri Application January 2, 1941, Serial No. 372,877

4 Claims. (Cl. 74—230.17)

This invention relates to drive mechanisms, particularly drive mechanisms of the type wherein power is transmitted from one shaft to another through an endless belt that encircles pulleys on the respective shafts and a manually operable clutch is provided for clutching one of said pulleys to its supporting shaft. The object of the present invention is to devise a simple and efficient smoothly operating drive mechanism of the above type having a compact and easily shiftable clutch, means for taking up slack of the endless power transmission belt, means for varying the speed relationship of the driving and driven shafts and provision for ready replacement of said belt. The invention consists in the belt and pulley drive mechanism and interposed clutch and in the construction, combinations and arrangements of parts hereinafter described and claimed.

In the accompanying drawings, which form part of this specification and wherein like symbols refer to like parts wherever they occur, Fig. 1 is a plan view of a drive mechanism embodying my invention, Fig. 2 is a vertical transverse section on the line 2—2 in Fig. 1, Fig. 3 is a vertical longitudinal section through the driven pulley and its supporting shaft on the line 3—3 in Fig. 1, Fig. 4 is a vertical longitudinal section taken along the driving shaft on the line 4—4 in Fig. 1.

Fig. 5 is a vertical cross-section on the line 5—5 in Fig. 4,

Fig. 6 is a bottom plan view of the parts shown in Fig. 4,

Fig. 7 is a vertical cross-section on the line 7—7 in Fig. 1, showing the clutch operating lever in position to disengage the clutch, Fig. 8 is a view similar to Fig. 7, showing said operating lever in clutch engaging position; and Fig. 9 is a section, similar to Fig. 4, showing a modified form of driving pulley.

My drive mechanism comprises spaced parallel horizontally disposed driving and driven shafts I and 2, respectively, supported by a horizontal cross member or bracket 3 whose middle portion seats on and is suitably secured to the upper end of a supporting pedestal or leg 4. The cross member 3 has yoke-shaped end portions 5 and 6, respectively. The driving shaft I is journaled in a housing 7 that is supported in the yoke 5 of the supporting bracket 3; and the driven shaft 2 is journaled in a housing 8 that is supported in the yoke 6 of said supporting bracket. Each of the housings 7 and 8 is secured in the supporting yoke by screws 9 that extend vertically through the respective branches of said yoke and have rectangular inner end portions 10 that seat in external longitudinal grooves 11 provided therefor in said housing. The screws are locked in the desired position of adjustment by cap nuts 12 that are threaded over the outer ends of said screws in endwise abutting relation to the respective branches of the yoke. By this arrangement, each housing and the shaft journaled therein may be adjusted vertically in its supporting yoke by proper manipulation of the screws 9, and said housing may be adjusted longitudinally of said shaft when said screws are loosened. Enclosed in each of the housings 7 and 8 is a bearing which preferably comprises a circular series of balls 13 interposed between an inner raceway member 14 and an outer raceway member 15. The inner raceway member 14 of each bearing is press-fitted on an adapter sleeve 16 that is rigidly secured to the shaft supported by said bearing by one or more set screws 17; and the outer raceway member 15 seats in the housing for said bearing. The bearing and adapter sleeve 16 for each of the housings 7 and 8 are inserted in and removed from said housing through an opening in one end thereof, which opening is closed by an annular closure member 18 that is removably secured to said housing by cap screws 19. Lubricant is supplied to the interior of each of the bearing housings 7 and 8 through a radial filler hole 20 in the cylindrical wall thereof that is closed by a threaded plug or screw 21.

The driving shaft I has a driving pulley A thereon and the driven shaft 2 has a driven pulley B; and each of said pulleys is located adjacent to the housing containing the bearing for its supporting shaft and on the side of said housing remote from the end thereof in which the bearing adapted receiving opening is located. Power is transmitted from the driving pulley A to the driven pulley through an endless power transmission band in the form of an endless flexible belt. As shown in the drawings, this driving belt is V-shaped in transverse cross-section and operates in a V-groove 23 in the driving pulley A and a V-groove 24 in the driven pulley B.

The housing 7 for the driving shaft bearing is provided on its pulley opposing end with an outwardly extending hub portion 25 that is spaced away from the driving shaft to provide an annular clearance space therebetween for the coil compression spring 26 that is sleeved on said shaft with one end seated against the opposing end of the supporting sleeve 16 for the driving shaft bearing and the other end bearing against the opposing end of a sleeve 27 that is rotatably and axially slidably mounted on said driving shaft. The sleeve 27 extends through the driving pulley A and is adapted to support a bearing therefor, said bearing preferably comprising a series of balls 28 interposed between an inner raceway member 29 and an outer raceway member 30. The inner raceway member 29 is pressed on the sleeve 27 between an external annular shoulder 31 thereon and a snap ring 32 seated in an annular groove provided therefor in said sleeve. The outer raceway member 30 seats in an internal annular groove 30a provided therefor in the driving pulley A.

The driving pulley A comprises two end sections 33 and 34 that are secured together by means of a circular series of cap screws 35. The two sections of the driving pulley A have the outer portions of their opposing end faces shaped to form the peripheral V-shaped belt receiving groove 23 in said pulley. The width of the V-shaped belt groove of the driving pulley A may be varied to change the effective diameter of said pulley and thus change the speed relationship of the drive and driven pulleys by means of one or more shims 36 interposed between one end of the outer raceway member 30 of the drive pulley bearing and the adjacent side wall of the annular supporting groove 30a therefor in said pulley.

The hereinbefore described drive mechanism is provided with a cone friction clutch for clutching the driving pulley A to the continuously rotating driving shaft 1. As shown in the drawings, the section 33 of the drive pulley A on the end thereof remote from the drive shaft bearing housing 7 has an outstanding axially extending internally coned peripheral flange 37 that is adapted to move with said drive pulley endwise of the drive shaft 1 into and out of engagement with the outstanding axially extending externally coned peripheral flange 38 of a member 39 which has a hub 40 fixed to said drive shaft by pairs of longitudinally spaced set screws 41 and constitutes the driving element of said clutch. A suitable friction material 42 is riveted or otherwise secured to the outer periphery of the external cone piece or flange 38 of the driving element 39 of the clutch to increase the friction between said driving element and the axially slidable internal cone piece or flange 37 of the driven element of said clutch.

The clutch is manually engaged and disengaged by means of a clutch shifting mechanism comprising an operating sleeve 43 that is slidably and rotatably mounted on the extended hub portion 25 of the non-rotary housing 7 for the drive shaft bearing between said housing and the axially slidable drive pulley A. One end of the sleeve 43 extends into an opening provided therefor in the adjacent end wall 44 of the driving pulley where it terminates in an external circumferential end flange 45 adapted when said sleeve is shifted axially in the direction of the bearing housing 7 to bear against the inner face of said end wall of said pulley and disengage the clutch element 37 from the clutch element 38. As shown in the drawings, a washer 46 of friction material is located between the opposing faces of the end wall 44 and the end flange 45 and is rigidly secured to one of said end walls and flange. Rigidly clamped to the sleeve 43 by means of a clamping screw 47 is a split collar 48 having a screw 49 that is threaded through a radial hole provided therefor in said collar, extends through a registering hole in said sleeve and terminates at its inner end in a tapered portion 50 that works in a cam slot 51 which is formed in the hub portion 25 of the bearing housing 7 and extends at an oblique angle to the axis thereof, whereby rotation of said collar imparts an endwise sliding movement to said sleeve and engages or disengages the clutch, depending on the direction in which said collar is rotated. Thus, when the sleeve is slid in one direction the end flange 45 thereof operates to pull the driving pulley A endwise along the continuously rotating driving shaft, against the pressure of the spring 26 and disengage the clutch element 37 of said pulley from the clutch element 38 which rotates with said shaft. When the sleeve is slid in the opposite direction, the end flange 45 thereof is disengaged from the driving pulley, thus permitting the coil spring 26 to force the bearing supporting sleeve 27 and the driving pulley A carried thereby along the driving shaft, in a direction that will cause the clutch element 33 of said pulley to engage the clutch element 39 rigid with the drive shaft. In this disengaged position of the clutch, the driving pulley A is held against rotation with the driving shaft by the endwise pressure of the end flange 45 of the sleeve 43 on said pulley. In the engaged position of the clutch, the sleeve 43 is entirely clear of the driving pulley, thus permitting said pulley to rotate without rotating said sleeve.

The clutch operating collar 48, together with the sleeve 43 on which said collar is clamped, are oscillated or rocked as a unit on the hub 25 of the non-rotary bearing housing 7 by means of a hand lever 52 which is pivotally secured, as at 54, to the supporting bracket 3 adjacent to the driven shaft 2 for vertical swinging movement crosswise of said shaft. This operating lever 52 has a radially extending arm 55 rigid therewith that is connected by means of a link 56 to a lug 57 that projects radially from the clutch operating collar 48. The pivotal connection between the arm 55 of the operating lever 54 and the link 56 comprises a shoulder screw 58 that extends through registering openings provided therefor in said arm and link and is locked with a nut 59. The pivotal connection between the link 56 and the radial lug 57 of the clutch operating collar 48 preferably comprises a pivot pin 60 extending through said lug and link and retained by means of cotter pins 61. The direction of inclination of the cam groove 51 in the hub 25 of the bearing housing 7 is such that when the operating lever is pulled forward, that is away from the driving shaft 1, as shown in Fig. 7, the clutch is disengaged and, when said lever is swung rearwardly, that is toward said driving shaft, as shown in Fig. 8, the clutch is engaged. As shown in Fig. 8, the collar 48 is provided with an outstanding lug 62 adapted, in the engaged position of the clutch, to abut against a stop pin 63 fitted in a hole 64 in the non-rotary bearing supporting housing 7. This stop pin relieves the clutch parts from shock when the hand lever 52 is violently actuated to engage the clutch. As shown in the drawings, the hub 25 of the housing 7 has an oblique cam groove 51a therein that is disposed at a reverse angle to and forms a continuation of the cam groove 51; and, at the place of juncture of the two reversely inclined communicating cam grooves, one side wall thereof has a depression 65 formed therein adapted, when the clutch is disengaged to provide a seat for the cam groove engaging end 50 of the pin or screw 49 carried by the collar 48 to thereby releasably hold said collar against rotation. These reversely inclined cam grooves 51 and 51a permit a plurality of clutches to be mounted on the drive shaft 1 in reversed relation; that is, turning end for end on said shaft, and all of said clutches engaged by moving their operating levers in the same direction and disengaged by moving said levers in the opposite direction. In this position of the parts shown in the drawings, the pin or screw 49 operates in the cam groove 51 only. When the clutch is turned end for end on the drive shaft, the screw 49 works in the cam groove 51a only. The bearing housing 7 is provided with a hole 64a, similar to the hole 64, adapted to receive the stop pin 63 when the position of the clutch is reversed, while the collar 48 has a lug 62a, similar to the lug 62, adapted in such reversed position to cooperate with the lug 62a.

The driven pulley B comprises two sections 66 and 67 having opposed disk-like portions that cooperate to form the V-groove 24 in said pulley. The pulley section 66 has a hub 68 projecting from the outer end face of its disk-like belt groove forming portion and fastened to the driven shaft 2 by means of set screws 69. The pulley section also has a relatively long hub portion 70 projecting from the opposite end face of its disk-like belt groove forming portion; and the other pulley section 67 has a long hub portion 71 that projects from the outer end face of its disk-like belt groove forming portion of said section and is mounted on and secured to the long hub 70 of the pulley section by means of set screws 72. The hub 71 of the pulley section 67 terminates substantially flush with the outer end of the long hub 70 of the pulley section 66 and has its outer end portion counterbored to provide an annular clearance space for a coil compression spring 73 whose inner end seats against the corresponding end of said counterbore and whose outer end seats against a collar or ring 74 that closes the other end of the annular spring receiving space. This annular spring seat or collar 74 is mounted on the long hub 70 of the pulley section 66 and is held thereon for axial movement therewith relative to the pulley section 67 by means of the spring 73 and a snap ring 75 that seats in an external annular groove provided therefor in said hub and an internal annular recess 76 in the outer end of the bore of said spring seat or collar. When it is desired to take up the slack of the belt 22, the set screws 72, which secure the two sections of the driven pulley together, are loosened and the spring 73 forces the pulley section 67 axially in the direction of the pulley section 66 fixed to the driven shaft 2, thus narrowing the V-groove in said pulley and thereby increasing the effective diameter thereof. The driven pulley is then rotated with the screws 72 still unfastened to permit the belt to seat in the pulley groove, after which said screws are tightened to rigidly secure the two sections of the pulley together. As the belt tension is the result of the pressure of the spring 73, such tension may be controlled by the strength of said spring.

The shaft supporting structure shown in the drawings includes a horizontal supporting tube 77 which is disposed parallel to the space between the shafts 1 and 2 and passes through the loop of the belt 22 and through a horizontal supporting opening 78 in the bracket 3. This tube is made in two sections that are rigidly secured together with a space 79 therebetween by a split coupling 80 whose sections are clamped together by through bolts 81 passing through said space. The driving shaft 1 is also made in sections with a space 82 between the adjacent ends of said sections, such space being normally covered by the hub 40 of the driving member 39 of the clutch on said shaft. By this arrangement, when it is desired to remove and replace the endless driving belt 22, the split coupling 80 is removed to expose the space 79 between the section of the tube 77 and the set screws 41 that secure the clutch element 39 to the shaft are loosened and said element is slid along said shaft far enough to expose the space 82 between the sections thereof. The belt may then be attached to and removed from the drive mechanism by passing the belt through the spaces or gaps 79 and 82 provided therefor in the tube 77 and driving shaft 1, respectively, and then sliding the belt endwise of the driven shaft or by removing the same.

The driving pulley $A^1$ shown in Fig. 9 is similar to the driving pulley A hereinbefore described, except that in the modified driving pulley construction the belt groove forming portions thereof are integral and said groove is thus not adjustable to take up the slack of the belt.

The hereinbefore described drive mechanism has several important advantages. The position of the drive shaft bearing housing, the clutch and the driving pulley may be reversed on the drive shaft without changing the direction of movement of the operating lever required for engaging and disengaging the clutch. The bearing housings for the driving and driven shafts may be adjusted longitudinally of the respective shafts and also vertically. The width of the belt groove in the driven pulley is adjusted by the spring thereon to take care of the slack or stretch of the endless driving belt and the pulley may be then locked in such position of adjustment. The speed relationship of the driving and driven pulleys may be varied by increasing or decreasing the number of shims in the driving pulley to thereby change the width of the V-groove therein and thus change the effective diameter of said pulley. The spaces between the ends of the sections of the driving shaft and the sections of the tubular member of the supporting framework of the drive mechanism permits removal and replacement of the belt without dismounting said shaft and tubular member. The clutch is compact and easily operable and may be made in several sizes depending on the speed required.

Obviously, the hereinbefore described drive mechanism admits of considerable modification. Therefore, I do not wish to be limited to the precise construction shown and described.

What I claim is:

1. A drive mechanism comprising laterally spaced shafts, V-groove pulleys on the respective shafts, an endless power transmission V-belt encircling both of said pulleys and riding in the V-grooves thereof, each of said pulleys comprising end sections axially movable relative to each other and cooperating to form the V-groove in said pulley, means for connecting one of said pulley sections to its supporting shaft for rotation therewith, means for adjusting said pulley sections axially relative to one another to vary the width of the V-groove therein and thus change the effective diameter of said groove, and means for rigidly securing said sections together in adjusted position, the adjusting means for one of said pulleys including detachable shims and the adjusting means for the other of said pulleys including a spring carried thereby and adapted upon release of the means for securing together the sections of said other pulley to urge one of said last mentioned pulley sections axially in the direction of the other.

2. A drive mechanism comprising laterally spaced shafts, V-groove pulleys mounted on the respective shafts, each of said pulleys comprising end sections cooperating to form the V-groove in said pulley, shims interposed between the sections of one of said pulleys for adjusting such sections axially relative to one another to vary the effective diameter of the V-groove in said pulley, means for rigidly securing sections of said pulley together, means for rigidly securing one of the sections of the other pulley to its supporting shaft for rotation therewith, releasable means for rigidly securing the other section of said other pulley to said first mentioned section thereof, and a spring carried by said other pulley and operable upon the release of the securing means for said other pulley section thereof to urge said other driven pulley section of said other pulley in the direction of said first mentioned driven section thereof to thereby increase the effective diameter of the groove in said other pulley.

3. In a driving mechanism, a shaft, a sleeve slidably and rotatably mounted on said shaft, a V-groove pulley surrounding said sleeve, an anti-friction bearing interposed between said sleeve and pulley and seating in an internal annular groove provided therefor in the latter, said pulley comprising end sections cooperating to form said V-groove and the groove for said bearing, shims interposed between one side wall of said internal annular groove in said pulley and the adjacent end face of said bearing to thereby vary the width of the V-groove in said pulley, and means for rigidly securing said pulley sections together.

4. A drive mechanism comprising laterally spaced driving and driven shafts, a V-groove driving pulley on said driving shaft, a V-groove driven pulley on said driven shaft, an endless power transmission V-belt encircling both of said pulleys and riding in the V-grooves thereof, a sleeve slidably and rotatably mounted on said driving shaft, an anti-friction bearing interposed between said sleeve and driving pulley and seating in an internal annular groove provided therefor in said pulley, said driving pulley comprising end sections cooperating to form the belt and bearing receiving grooves therein, shims interposed between one side wall of said internal annular groove in said driving pulley and the adjacent end face of said bearing to thereby vary the width of the V-groove in said driving pulley, and means for rigidly securing said driving pulley sections together, said driven pulley comprising two end sections axially movable relative to one another and cooperating to form the V-groove in said driven pulley, means for rigidly securing one of said driven pulley sections to said driven shaft, releasable means for rigidly securing the other driven pulley section to said first mentioned driven pulley section, and a spring carried by said driven pulley and operable upon the release of the securing means for said other driven pulley section and against the tension of said belt to press said other driven pulley section in the direction of said first mentioned driven pulley section to thereby narrow the V-groove in said driven pulley and thus place said belt under tension.

HARRY W. KRAG.